(12) United States Patent
Kadosh

(10) Patent No.: US 10,415,618 B2
(45) Date of Patent: Sep. 17, 2019

(54) QUICK LOCK-RELEASE MECHANISM FOR ASSEMBLING A TABLE PLATE TO TABLE LEGS

(71) Applicant: Yariv Kadosh, Tel Aviv (IL)

(72) Inventor: Yariv Kadosh, Tel Aviv (IL)

( * ) Notice: Subject to any disclaimer, the term of this patent is extended or adjusted under 35 U.S.C. 154(b) by 299 days.

(21) Appl. No.: 15/498,486

(22) Filed: Apr. 27, 2017

(65) Prior Publication Data

US 2018/0313383 A1    Nov. 1, 2018

(51) Int. Cl.
*F16B 12/48* (2006.01)
*A47B 3/00* (2006.01)
*A47B 3/06* (2006.01)
*A47B 13/00* (2006.01)

(52) U.S. Cl.
CPC .............. *F16B 12/48* (2013.01); *A47B 3/002* (2013.01); *A47B 3/06* (2013.01); *A47B 13/003* (2013.01); *A47B 2003/006* (2013.01)

(58) Field of Classification Search
CPC ....... A47B 3/08; A47B 3/0918; A47B 3/0803; A47B 13/08; F16B 12/26; F16B 12/38
USPC .......... 108/115, 124, 156, 157.1, 153.1, 158, 108/158.12
See application file for complete search history.

(56) References Cited

U.S. PATENT DOCUMENTS

| | | | | |
|---|---|---|---|---|
| 1,800,685 A | * | 4/1931 | Griffis | A47B 3/02 108/159.11 |
| 4,249,799 A | * | 2/1981 | Iglesias | F16L 37/086 279/35 |
| 5,477,709 A | * | 12/1995 | Rowe | D06B 5/16 242/597.4 |
| 8,156,628 B2 | * | 4/2012 | Roth | E05B 47/0038 24/662 |
| 8,974,138 B2 | * | 3/2015 | Liao | G10D 13/026 403/330 |
| 10,064,441 B1 | * | 9/2018 | Provencher | A41F 1/002 |

FOREIGN PATENT DOCUMENTS

| | | | | |
|---|---|---|---|---|
| DE | 29710038 U1 | * | 8/1997 | ........... A47B 13/003 |
| DE | 202016101572 U1 | * | 4/2016 | .............. F16B 12/44 |
| EP | 1413224 A1 | * | 4/2004 | ............ A47B 13/02 |
| GB | 992305 A | * | 5/1965 | ........... A47B 13/003 |

* cited by examiner

*Primary Examiner* — Joshua T Kennedy

(57) ABSTRACT

A quick lock-release mechanism for assembling a table plate to table legs that includes a lower ring, a cap, two locking wings and a two springs. The lower ring includes a central hole and two opening pins. The cap includes a circumferential rim and two pins. The locking wings include an axial hole, a hole for receiving a tension screw and a sloping side. The springs and the locking wings are designed to be assembled onto the spring wings pins. The tension screws are designed to be screwed into the holes for receiving the tension screw. The springs push the locking wings toward the center of the mechanism so that the locking wings cover a part of the central hole and when rotating the cap relatively to the lower ring the spring wings pins exert force on the locking wings and push back the locking wings.

3 Claims, 7 Drawing Sheets

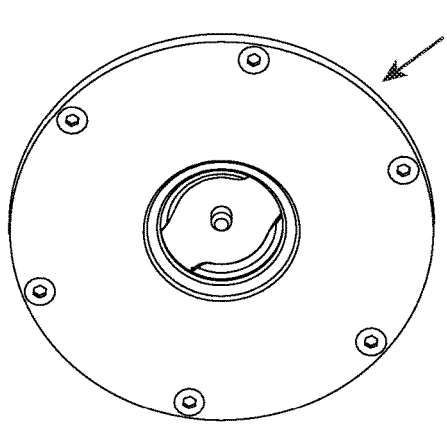
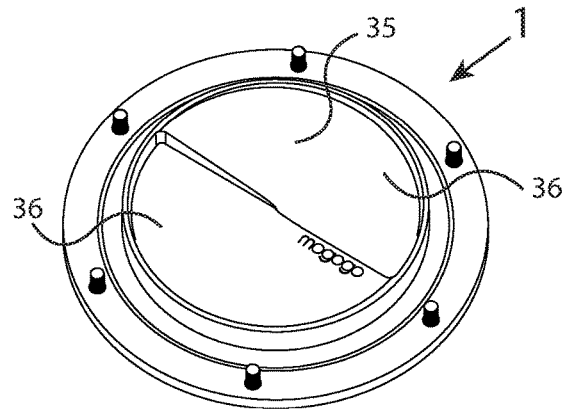
FIG 2          FIG 1
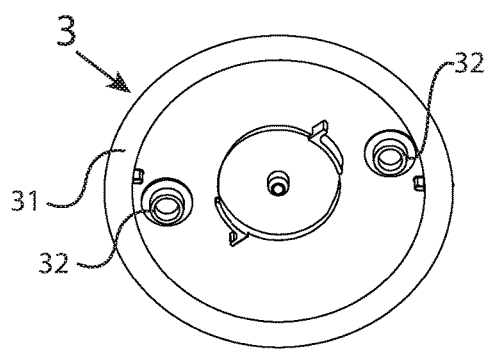
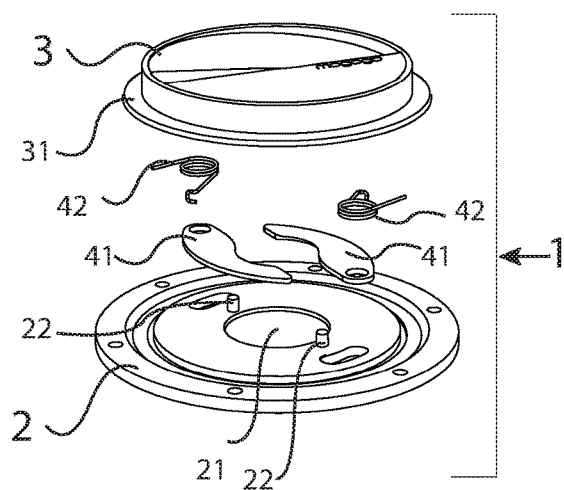
FIG 4          FIG 3
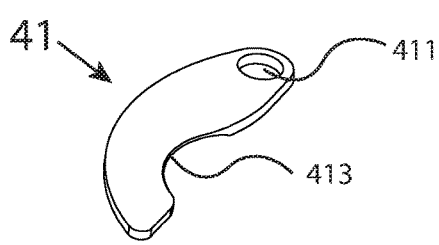
FIG 5

US 10,415,618 B2

QUICK LOCK-RELEASE MECHANISM FOR ASSEMBLING A TABLE PLATE TO TABLE LEGS

TECHNICAL FIELD

The present invention refers to a quick Lock-Release mechanism for assembling a table plate to table legs.

BACKGROUND ART

There are many types of tables that comprise a table plate and table legs, which are designed to be assembled together for use and reassembled after use. The invention subject matter of the present patent application describes a quick Lock-Release mechanism for assembling a table plate to table legs which enables the user to assemble and reassemble the table plate to the table legs in a quick and simple manner.

LIST OF DRAWINGS

The intention of the drawings attached to the application is not to limit the scope of the invention and its application. The drawings are intended only to illustrate the invention and constitute only one of its many possible implementations.

FIG. 1 depicts the top perspective view of the mechanism (1).

FIG. 2 depicts the bottom perspective view of the mechanism (1).

FIG. 3 is an exploded view of the mechanism (1) and its parts.

FIG. 4 is a bottom view of the cap (3).

FIG. 5 depicts the locking wing (41).

THE INVENTION

The main objective of the present invention is to provide a quick Lock-Release mechanism (1) for assembling a table plate (100) to table legs (200). FIG. 1 depicts a top perspective view of the mechanism (1), FIG. 2 depicts a bottom perspective view of that mechanism (1) and FIG. 3 is an exploded view of the mechanism (1) and its parts.

Figures 6, 7:
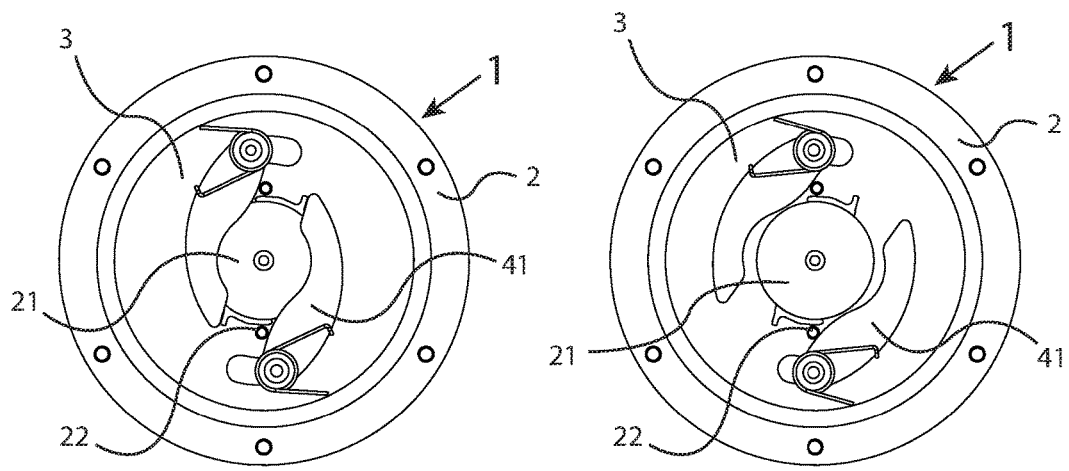
FIG. 6 depicts the mechanism (1) in a locking state.
FIG. 7 depicts the mechanism (1) in a released state.

The Mechanism (1) includes a lower ring (2), a cap (3), a couple of locking wings (41) and a couple of springs (42). The lower ring (2) includes a central hole (21) and a couple of opening pins (22). The cap (3) includes a circumferential rim (31) and a couple of spring wing pins (32). FIG. 4 is a bottom view of the cap (3). The locking wings (41) include an axial hole (411) and a sloping side (413), as depicted for example in FIG. 5. Assembling the mechanism (1): The springs (42) and the locking wings (41) are assembled onto the spring wings pins (32) through the axial holes (412). In this state, the springs (42) push the locking wings (41) toward the center of the mechanism (1) so that the locking wings (41) cover a part of the central hole (21) of the lower ring (2) (hereinafter "the locking state") as depicted for example in FIG. 6. When rotating the cap (3) relatively to the lower ring (2) the spring wings pins (32) exert force on the locking wings (41) and push back the locking wings (41) so that the locking wings (41) do not cover the central hole (21) or part of it (hereinafter "the released state"), as depicted for example in FIG. 7.

Figure 8:
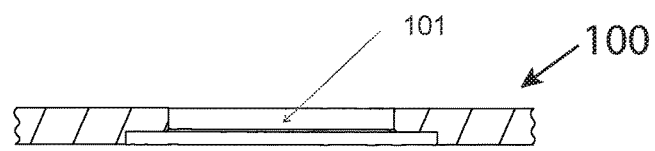
FIG. 8 depicts schematically the cross-sectional side view of the table plate (100).

Assembling the mechanism (1) to the table plate: The table plate (100) includes a hole (101) for receiving the mechanism (1). FIG. 8 depicts schematically a cross-section side view of the table plate (100) with the hole (101). The mechanism (1) is inserted into the hole 101 as shown for example in FIG. 9, which is a cross-sectional view of the mechanism (1) when it is assembled with the table plate (100). The circumferential rim (31) of the cap (3) can be free to rotate especially if the circumferential rim of the cap is a bit higher.

Figure 9:
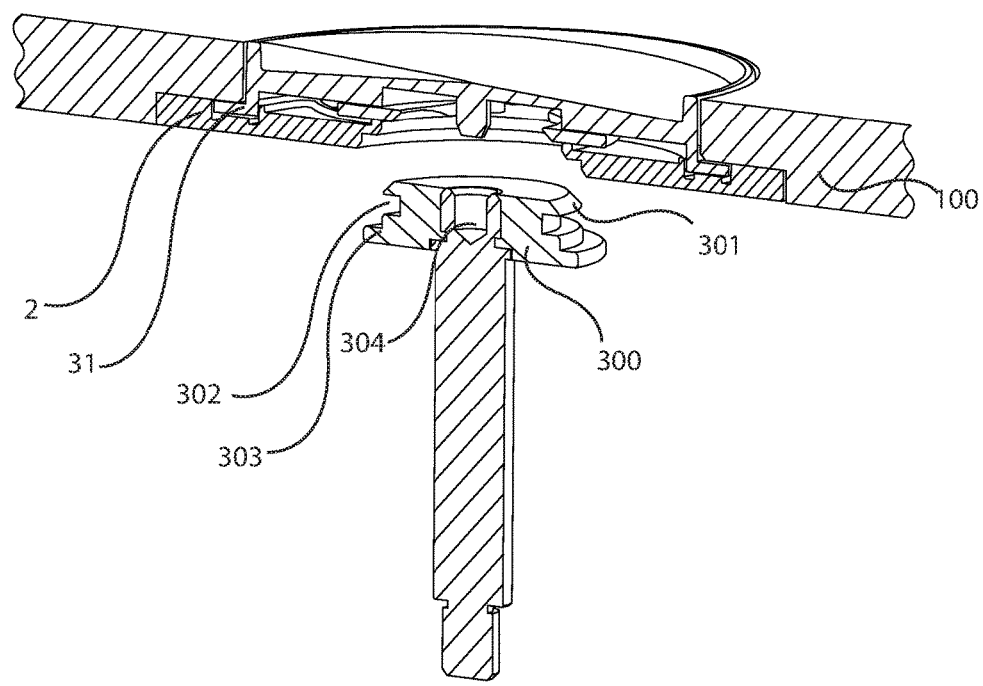
FIG. 9 depicts the cross-sectional view of the mechanism (1) assembled with the table plate (100).
Figure 10:
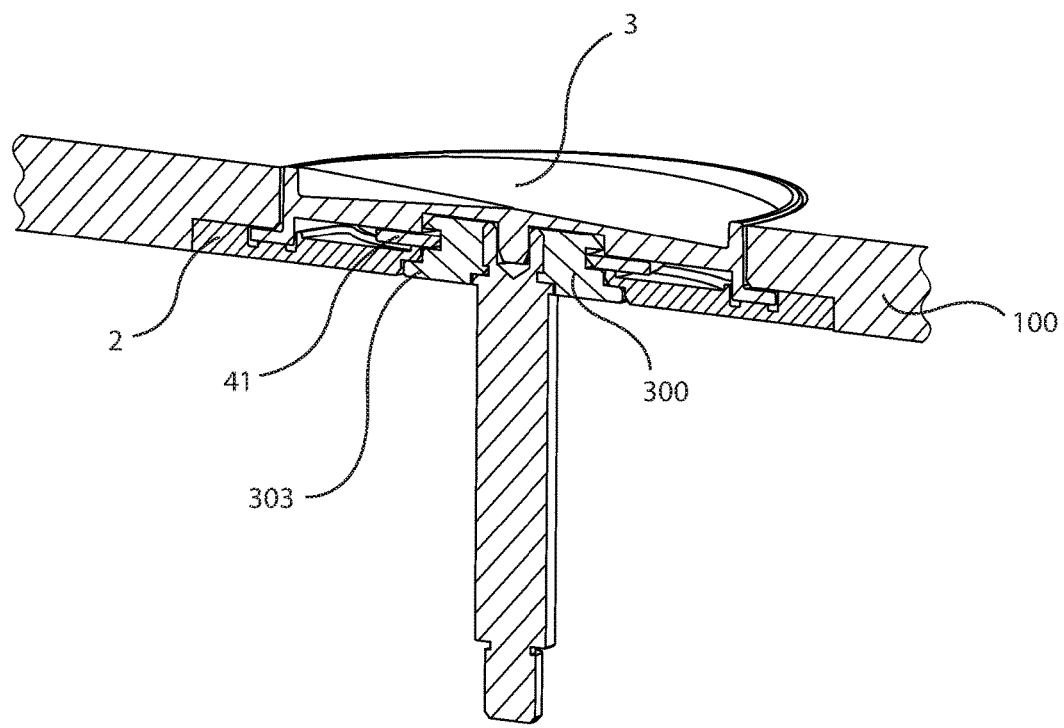
FIGS. 10 and 11 depict the cross-sectional view of the mechanism (1) assembled with the mushroom (300).
Figure 11:
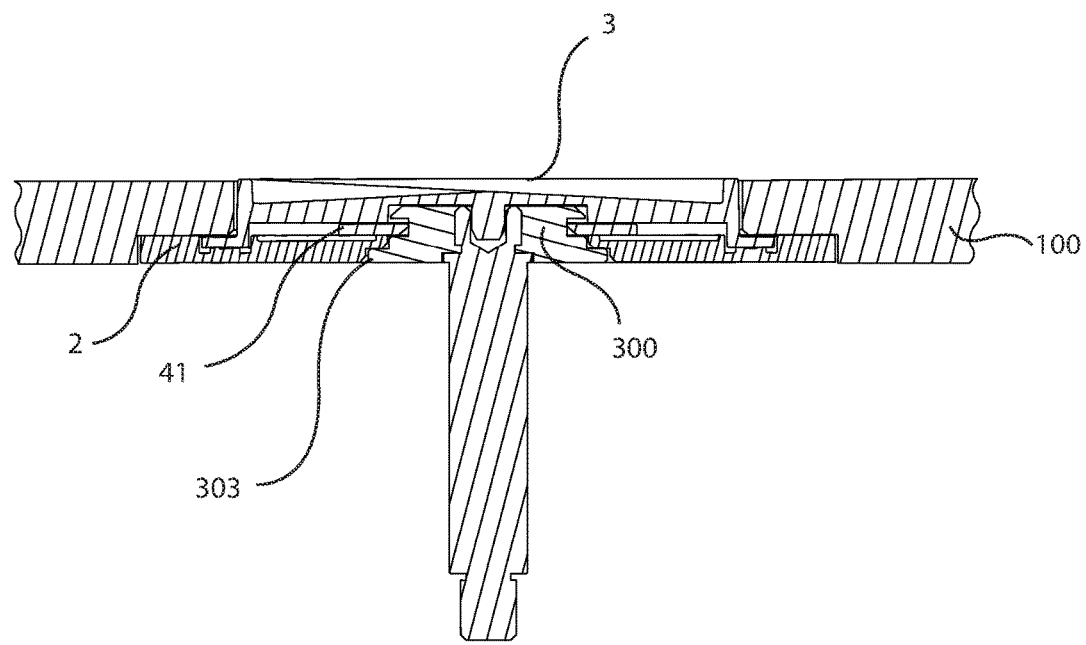

The mechanism (1) is designed to be assembled onto the table legs (200) that are equipped with a vertical mushroom (300) as described in the figures. The vertical mushroom (300) has an upper sloping ring (301), a recess (302) and a bottom stopping rim (303). When the mushroom (300) penetrates the mechanism (1) through the central hole (21) of the lower ring (2), the upper sloping ring (301) contacts the sloping sides (413) of the wings (41) and pushes them to the sides, and after the mushroom goes up a bit the wings (41) are then penetrates into the recess (302) and locking the mechanism (1) to the table plate (100). FIG. 9 illustrates the mushroom (300) before its insertion into the mechanism (1). FIGS. 10 and 11 depict a cross-sectional view of the mechanism (1) assembled with the mushroom (300).

The cap (3) may also include a closing movement stopper that is designed to function in a locking state and is aimed to stop the closer of the locking wings. By that, the locking wings (41) do not press on the mushroom (300). The cap (3) may also include a central vertical pin (34) that is designed to be inserted into a central top hole (304) on the top of the mushroom (300), for positioning the mushroom exactly in its place within the mechanism (1).

Figure 12:
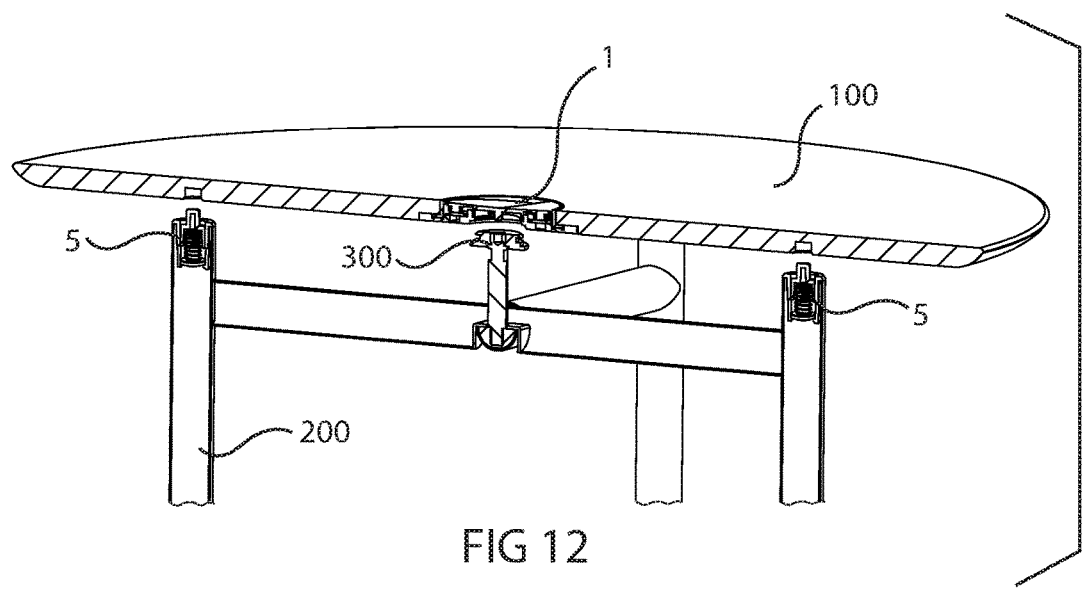
FIG. 12 depicts the table plate (100) and the table legs (200) before assembling.
Figure 13:
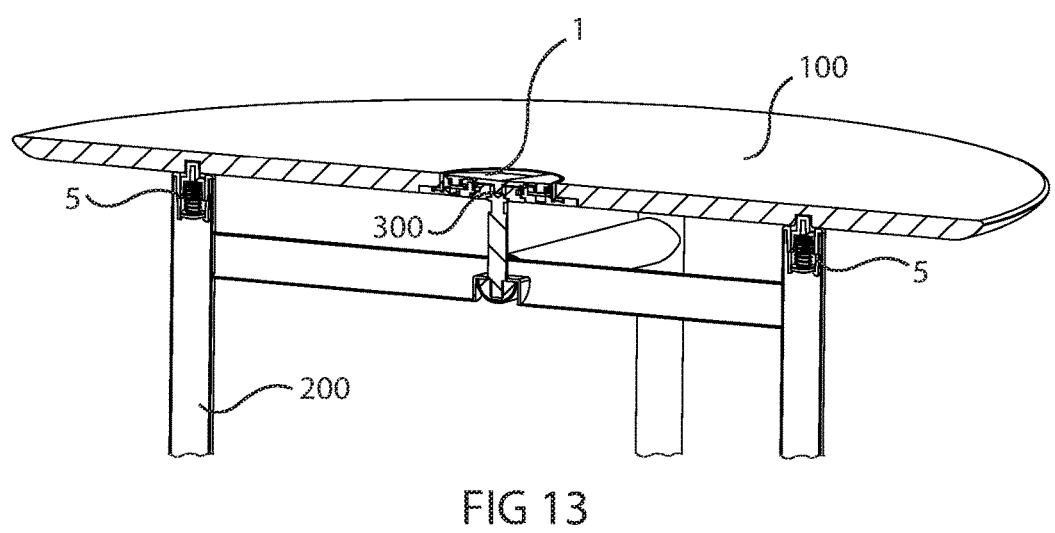
FIGS. 13-15 depict the table plate (100) assembled to the table legs (200).
Figure 14:
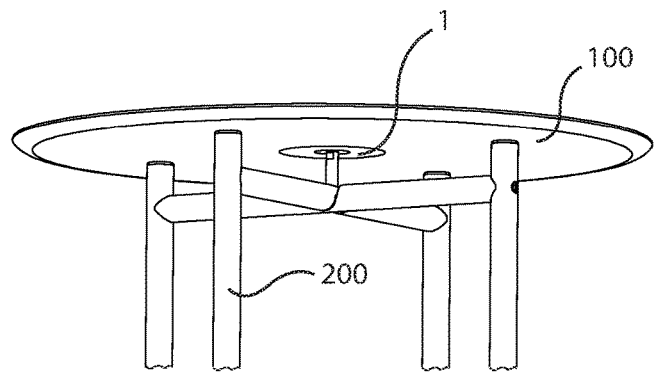
Figure 15:
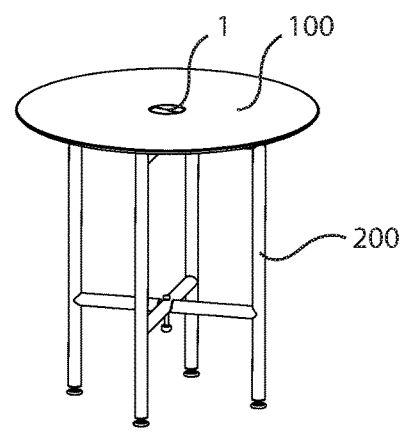

FIG. 12 describes the table plate (100) and the table legs (200) before assembling them one to the other, and FIG. 13 describes these parts after assembling them together. It is clear from the figures that the mushroom (300) is connected to the table legs (200). FIGS. 14 and 15 depict the table plate (100) assembled with the table legs (200) by the mechanism (1).

Figure 16:
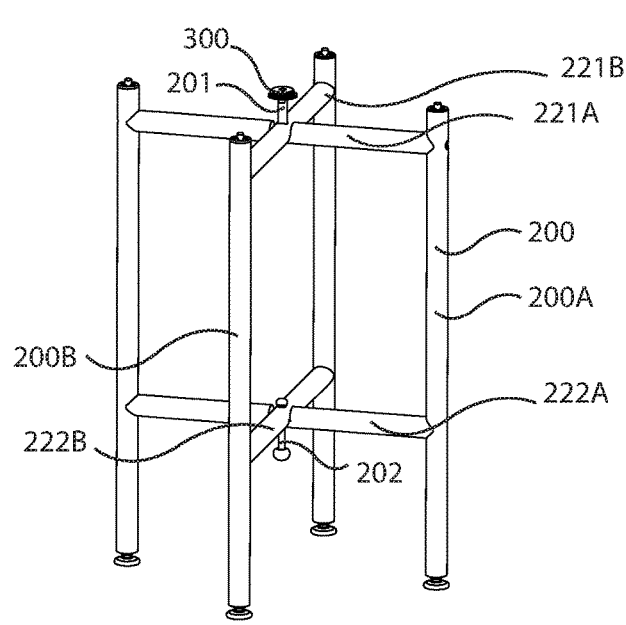
FIGS. 16-18 depict the table legs (200).
Figure 17:
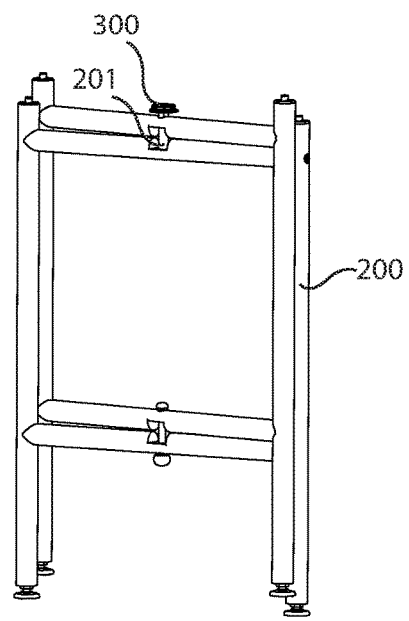
Figure 18:
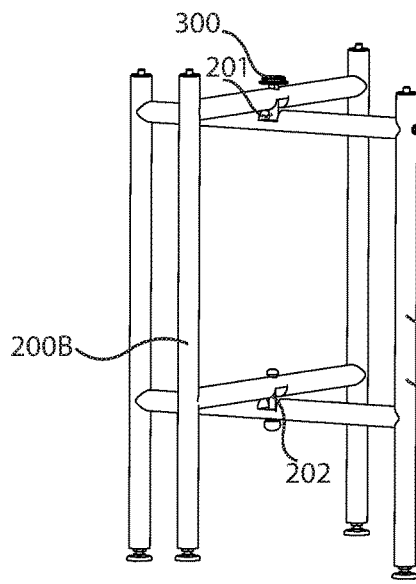

The table legs (200) comprise a first couple of legs (220A) and a second couple of legs (220B), as described for example in FIG. 16. The first couple of legs (220A) is connected together by an upper first horizontal rod (221A) and a bottom first horizontal rod (222A). The second couple of legs (220B) is connected together by an upper second horizontal rod (221B) and a bottom second horizontal rod (222B). The first couple (220A) and the second couple (220B) are connected together by upper and bottom vertical axial pins (201) (202) whereby enables the user to lift up the first couple (220A), as described for example in FIG. 17, and then rotate it relatively to the second couple (220B) to a closed position as described for example in FIG. 18. It is possible to connect the mushroom (300) to the top of the upper pin (201) as described in the figures.

Figure 19:
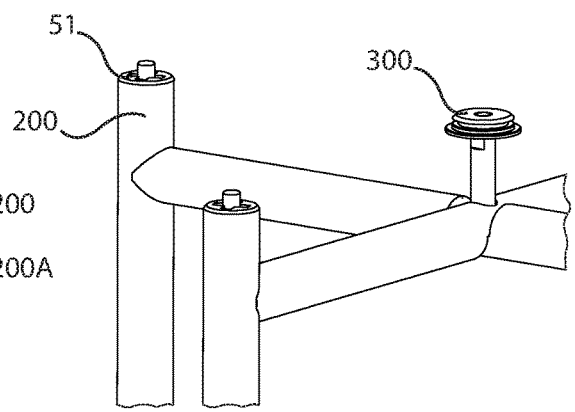
FIG. 19 depicts the springy pin (51) of the plunger (5) on the legs.
Figure 20:
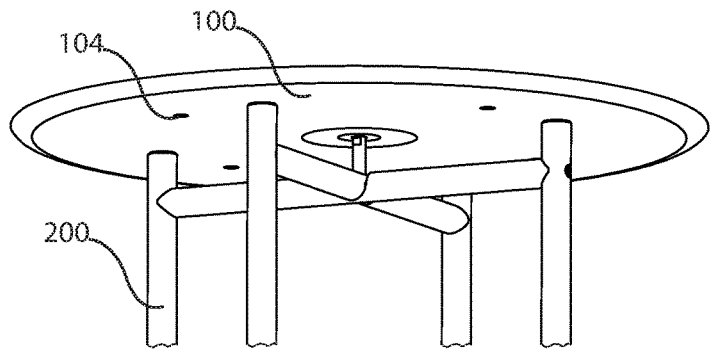
FIG. 20 depicts the bottom holes (104) on the bottom side of the table plate (100).
Figure 21:
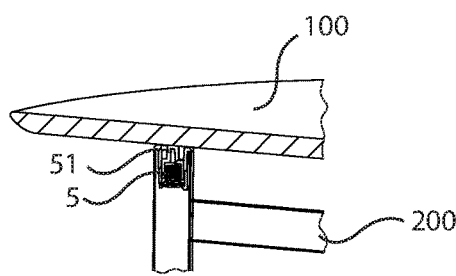
FIGS. 21 and 22 depict the function of the plunger (5) and its springy pin (51).
Figure 22:
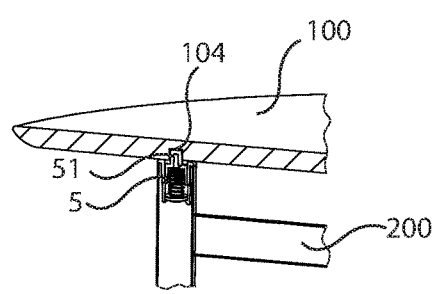
Figure 23:
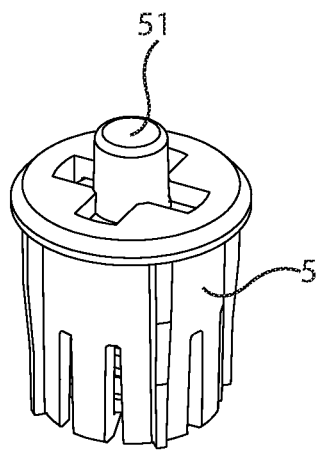
FIGS. 23 and 24 depict the plunger (5) and its springy pin (51).
Figure 24:
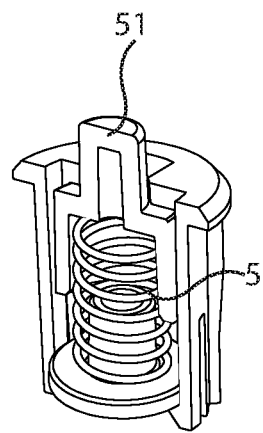

A locking plunger (5) equipped with a springy pin (51) is positioned on the top of one of the legs or on all of them. The springy pin (51) is designed to be inserted into one of bottom holes (104) which are located on the bottom side of the table plate (100). FIG. 19 depicts the springy pin (51) of the plunger (5) on the legs of the table legs (200). FIG. 20 depicts the bottom hole (104) on the bottom side of the table plate (100). When the table plate (100) is assembled onto the table legs (200) the table plate pushes down the springy pin (51) as described for example in FIG. 21, and then the user rotates the table plate until the springy pin (51) is inserted into one of the bottom holes (104). FIG. 23 depicts the plunger (5) and FIG. 24 depicts a cross-sectional view of the same. The tops of the other legs of the table legs (200) which do not include a plunger may include a rubber cap for friction resistance.

The cap (3) serves in fact as a button for changing the locking state to the released state, simply by rotating the cap (3) about 15 degrees. The tope side (35) of the cap (3) includes two sloping cavities (36) that are designed in a way that enables the user to rotate the cap (3) only one way, from locking state to released state. This structure of the sloping cavity also enables the user to clean it easily. The lower ring (2) may also include one or more drain holes for liquids that may be spilled on the table.

The locations of the holes 104 and the plungers themselves enable the user to fix the plate 100 (when it is rectangular) onto the legs 200 in a correct geometric manner (the imagined rectangular of the legs is parallel to the plate, e.g. the corners of this imagined rectangular are in harmony with the corners of the plate. In addition, the plungers' pins 51 exert upward force on the plate and these forces stabilized the plate onto the legs.

What is claimed is:

1. A system comprising:
    a quick lock-release mechanism, comprising:
        a lower ring comprising a central hole and a pair of opening pins;
        a cap comprising a circumferential rim and a pair of spring wing pins;
        a pair of locking wings, each wing comprising an axial hole and a sloping side; and
        a pair of springs;
            wherein the springs and the locking wings are assembled onto respective ones of the spring wing pins, each of which extend through respective axial holes of the locking wings;
            wherein the springs bias the locking wings toward a center of the mechanism so that the locking wings cover at least a part of the central hole of the lower ring;
            wherein when rotating the cap relatively to the lower ring, the opening pins exert force on the locking wings and push them back;
    a table plate comprising a hole for receiving the mechanism, wherein the mechanism is configured to be inserted into the hole of the table plate;
    a table leg assembly having a vertical mushroom comprising an upper sloping ring and a recess, wherein when the mushroom penetrates the mechanism through the central hole of the lower ring, the upper sloping ring biases the sloping sides of the locking wings away from the central hole such that, when the upper sloping ring clears the locking wings, the locking wings positively engage the recess which locks the mechanism to the table plate.

2. The system according to claim 1, wherein said table leg assembly further comprises a first pair of legs and a second pair of legs;
    wherein the first pair of legs is connected together by an upper first horizontal rod and a bottom first horizontal rod; wherein the second pair of legs is connected together by an upper second horizontal rod and a bottom second horizontal rod;
    wherein the first pair and the second pair are connected together by upper and bottom vertical axial pins whereby enables the user to lift up the first pair and then rotate it relatively to the second pair to a closed position.

3. The system according to claim 2, wherein said table leg assembly further comprises one or more locking plungers which are each equipped with spring-biased pins;
    wherein the locking plungers are positioned on top of each of the legs; and
    wherein the spring-biased pins are designed to be inserted into bottom holes on a bottom side of said table plate.

* * * * *